United States Patent [19]

Mitsuyu et al.

[11] Patent Number: 5,079,594
[45] Date of Patent: Jan. 7, 1992

[54] NONLINEAR OPTICAL THIN-FILM

[75] Inventors: Tsuneo Mitsuyu; Kazuhiro Ohkawa, both of Hirakata; Takeshi Karasawa, Suita, all of Japan

[73] Assignee: Matsushita Electric Industrial Co., Ltd., Osaka, Japan

[21] Appl. No.: 543,583

[22] Filed: Jun. 26, 1990

[30] Foreign Application Priority Data

Jun. 26, 1989 [JP] Japan ................................. 1-163056

[51] Int. Cl.⁵ ..................................... H01L 27/12
[52] U.S. Cl. ............................... 357/4; 357/16; 357/32; 357/45; 357/47; 357/55
[58] Field of Search ............... 357/4, 16, 32, 45, 47, 357/55

[56] References Cited

U.S. PATENT DOCUMENTS 4,843,032  6/1989  Tokuda et al. ..................... 357/4

OTHER PUBLICATIONS

Jain et al., "J. Opt. Soc. Am.", 73(5) 647-653 (May 1983).

Primary Examiner—Edward J. Wojciechowicz
Attorney, Agent, or Firm—Wenderoth, Lind & Ponack

[57] ABSTRACT

Nonlinear optical thin-films are disclosed. The nonlinear optical thin-film is comprised of a substrate, superlattice thin films formed separated on the surface of the substrate and a cover thin film of an insulating material or a semiconductor which covers the surface of the substrate on which the superlattice thin films are formed. Each superlattice thin film is formed by depositing two kinds of semiconductors having different band-gap energies alternatively.

13 Claims, 3 Drawing Sheets

NONLINEAR OPTICAL THIN-FILM

BACKGROUND OF THE INVENTION

1. Field of the Invention

The present invention relates to nonlinear optical thin-films utilized for optical switches, optical harmonic generators or the like, particularly to that having a semiconductive fine structure capable of exhibiting an extremely large optical nonlinearity.

2. Related Art

Conventionally, there has been known a semiconductor doped glass as a nonlinear optical material exhibiting a large nonlinearity.

FIG. 4 is a schematic cross-sectional view showing a fine structure of the conventional nonlinear optical thinfilm. As shown therein, this material is comprised of a glass matrix 1 and semiconductor ultra-fine particles 2 dispersed in the glass matrix. The optical nonlinearity of this material per a unit volume of the same is extremely large and it is reported that the optical nonlinearity amounts to about 200 times as large as that of a bulk crystal of the same semiconductor. Although reasons why such a large optical nonlinearity is obtained are not so clear, it is supposed that a quantum size effect contributes thereto which is caused for excitons (composite particles each comprised of an electron and a hole) generated in the semiconductor to be trapped in respective ultra-fine particles. However, it is very difficult to heighten the volume ratio of the ultra-fine particles up to about 1% since the semiconductor-doped glass is made by subjecting a homogeneous glass body containing components of the semiconductor to a heat treatment for crystallizing semiconductor ultra-fine particles. Due to this, the optical nonlinearity obtained actually is not so large in comparison with that of the bulk crystal. Further, since it is difficult to unify the shape and size of the ultra-fine particle and the crystallographic orientation, the actual nonlinearity is not so large as expected.

SUMMARY OF THE INVENTION

One object of the present invention is to provide nonlinear optical thin-films which exhibit a large optical nonlinearity.

Another object of the present invention is to provide nonlinear optical thin-films wherein fine semiconductor domains having unified shape size and crystallographic orientation are dispersed in a high density.

In order to achieve these objects, according to the present invention, there is provided a nonlinear optical thin-film comprising a substrate, a plurality of superlattice thin films formed separated with each other on one surface of said substrate, each of said superlattice thin films being formed by stacking layers of two kinds of semiconductors having band-gap energies different from each other alternatively, and a cover thin film made of a semiconductor or an insulator being formed so as to cover said one surface of said substrate, said semiconductor or insulator of said thin film having a band-gap energy wider than the smaller one of those of said two kinds of semiconductors.

The nonlinear optical thin-film according to the present invention can provide superlattice thin films arranged regularly in a high density and, therefore, exhibits an extremely large optical nonlinearity due to the quantum size effect.

BRIEF DESCRIPTION OF THE DRAWINGS

These and other objects and features of the present invention will become clear from the following description taken in conjunction with the preferred embodiment thereof with reference to the accompanying drawings, in which.

DETAILED DESCRIPTION OF THE PREFERRED EMBODIMENT

First Preferred Embodiment

Figure 1:
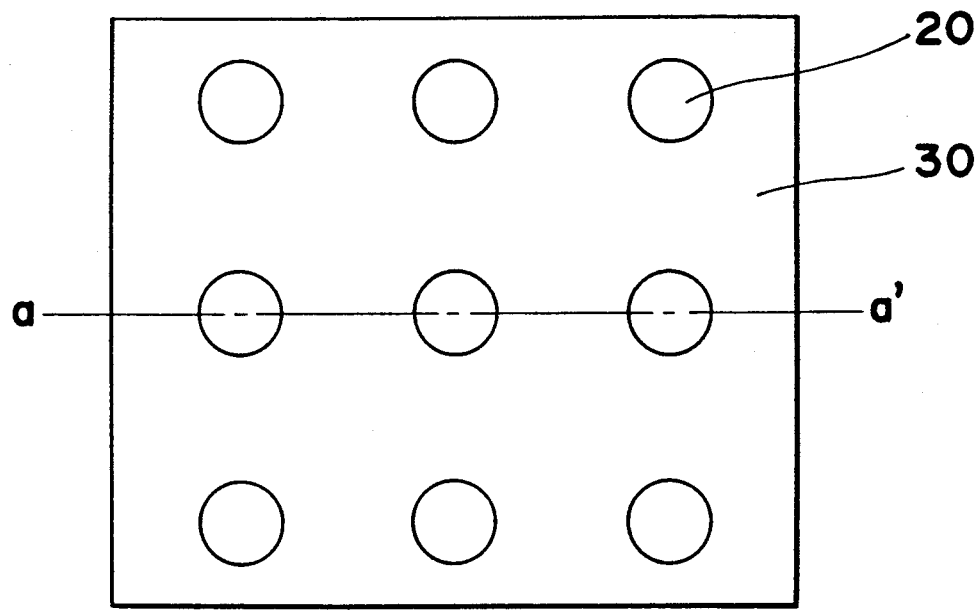
FIGS. 1(a) and 1(b) are schematic enlarged plan and cross-sectional views of the nonlinear optical thin-film according to the first preferred embodiment of the present invention, respectively.
Figure 1:
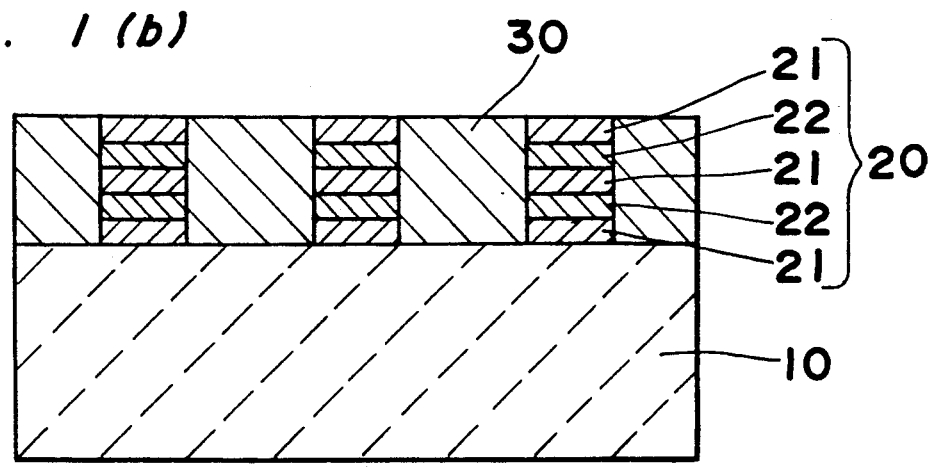

FIG. 1(a) is a schematic plan view of the nonlinear optical thin-film according to the first preferred of the present invention and FIG. 1(b) is a cross-sectional view along a—a' line of FIG. 1(a).

As shown in FIG. 1(b), the nonlinear optical thinfilm is comprised of a substrate 10, a plurality of superlattice thin films 20 formed separated on the substrate 10 and an insulating thin film 30 covering the remaining area of the substrate 10. Each superlattice thin film 20 has a cylindrical shape having a small diameter and is formed by stacking thin layers 21 and 22 of two kinds of semiconductors having different band-gap energies alternatively.

In such a structure as mentioned above, electrons and holes in the semiconductor layers 21 and 22 are confined in the semiconductor layers having a smaller band-gap energy. Due to this structure, electrons and holes optically excited are condensed into a high density and, thereby, the optical nonlinearity is increased by the band filling effect and/or the like when compared with that of an ordinal bulk semiconductor.

Further, if thicknesses of the semiconductor layers 21 and 22 were chosen properly, quantum levels of electrons and holes are formed in respective layers and, accordingly, it becomes possible to confine electrons and holes therein. The desirable thickness of the semiconductor layer depends upon the material thereof and is, for instance, of an order of several $nm_s$. When, quantum levels are formed in each semiconductor layer, excitons are easily formed by bonding of a pair of electron and hole locating in the same quantum level. Excitons thus formed increase the optical nonlinearity much more due to the nonlinear polarization effect thereby. Further, if the diameter of the superlattice thin film 20 were chosen so as to be smaller than or equal to two times as long as the Bohr radius of the exciton in this structure, excitons are confined in the radial direction of the superlattice thin film. This enables obtention of a larger optical nonlinearity.

Furthermore, if the minimum distance between adjacent superlattice thin films were set at a lower limit needed for confining electrons and holes therein, it becomes possible to distribute the superlattice thin films 20 in the highest density without damaging the optical nonlinearity of the superlattice thin film and, accordingly, the largest optical nonlinearity is obtained as a whole. The minimum distance depends upon materials forming the superlattice thin film 20 and the insulating thin film 30 and is, for example, of an order of several $nm_s$.

When dimensions of the nonlinear optical thin-film are set as follows, namely, the thicknesses of the semiconductive layers 21 and 22 are set equal to each other, and the diameter of the superlattice thin film 20 is set equal to the minimum distance between adjacent superlattice thin films, the volume ratio of the superlattice thin films contributing as a confining volume for electrons, holes and excitons becomes about 13%. This enables obtention of an optical nonlinearity such as about ten times as large as that of the conventional semiconductor doped glass.

In case of the structure according to the present invention, since it is easy to unify the thickness of each semiconductor thin film, the quantum levels are made constant with each other and, accordingly, an extremely large optical nonlinearity enhanced resonantly to a specific wavelength can be obtained. This resonance effect contributes to realize a larger optical nonlinearity together with the volume effect mentioned above.

It is desirable to use a single crystal material as the substrate since the single crystal is able to make the crystallographic orientation uniform upon epitaxially growing the superlattice thin films. This makes it possible to obtain an unisotropic property which is impossible to obtain by the semiconductor doped glass and, therefore, a nonlinearity of the second order can be utilized according to the present invention.

As the material for the superlattice this film, group III - V compound semiconductors and group II - VI compound semiconductors are especially suitable. This is due to the reason that freedom in selecting the lattice constant, the band-gap energy and the like are large and it is easy to realize the superlattice structure exhibiting an excellent nonlinearity at an arbitrary wavelength. In this context, $Al_xGa_{l-x}As$ system semiconductors ($x=0\sim1$) are especially desirable among group III - V compound semiconductors. Since the lattice constant is hardly varied due to the component x in these semiconductors, it becomes possible to epitaxially grow superlattices having an excellent crystal structure. Further, it is desirable to use a GaAs single crystal for the substrate 10 when one of these semiconductors is employed. It is also desirable to form superlattices using $In_xGa_{l-x}As$ ($x=0\sim1$) and InP. The lattice constant of $In_xGa_{x-l}As$ coincides with that of InP when the component x is made equal to about 0.53 and therefore, excellent superlattices can be obtained. In this case, InP single crystal is desirably used as the substrate 10.

Among group II - VI compound semiconductors, $ZnS_xSe_{l-x}$, $CdS_xSe_{l-x}$, $Zn_xCd_{l-x}S$, $Zn_xCd_{l-x}Se$, $Zn_xCd_{l-x}Te$, $Zn_xMn_{l-x}Se$, $Zn_xMn_{l-x}Te$, $Cd_xMn_{l-x}Se$ and $Cd_xMn_{l-x}Te$ materials ($x=0\sim1$) are especially desirable. In the case of $ZnS_xSe_{l-x}$, $Zn_xCd_{l-x}S$ or $Zn_xMn_{l-x}Se$ among these materials, GaAs single crystal is desirably used as the substrate since a good lattice matching can be obtained between the both materials. In the case of $CdS_xSe_{x-1}$, $Zn_xCd_{l-x}Se$, $Zn_xMn_{l-x}Te$ or $Cd_xMn_{l-x}Se$, a substrate of InP single crystal is desirably used to obtain excellent superlattice thin films.

Besides, it is effective to form superlattice thin films 20 by a combination of a group III - V compound semiconductor and a group II - VI compound semiconductor and the combination of GaAs and $ZnS_xSe_{l-x}$ ($x=0\sim1$) is especially desirable to obtain excellent superlattice thin films. In this case, GaAs single crystal is desirable as the substrate 10.

Next, as materials for the insulating thin film 30, inorganic glass materials and organic polymer compounds are desirable because these materials are easy to form into thin films being optically transparent and having a low scattering property to the light, and it is possible to obtain properties desirable for the nonlinear optical thin-film by adjusting the refraction index by altering compositions of respective components.

The insulating thin film 30 may be replaced with a semiconductor thin film. However, in this case, it is necessary that the band-gap energy of the semiconductor thin film be wider than the narrower one of those of the two kinds of the semiconductors forming the superlattice thin film 20. If this condition were satisfied, electrons and holes are confined in each superlattice thin film and, therefore, it becomes possible to obtain a large nonlinear optical effect similar to the case in that the insulating thin film is used.

Second Preferred Embodiment

Figure 2A:
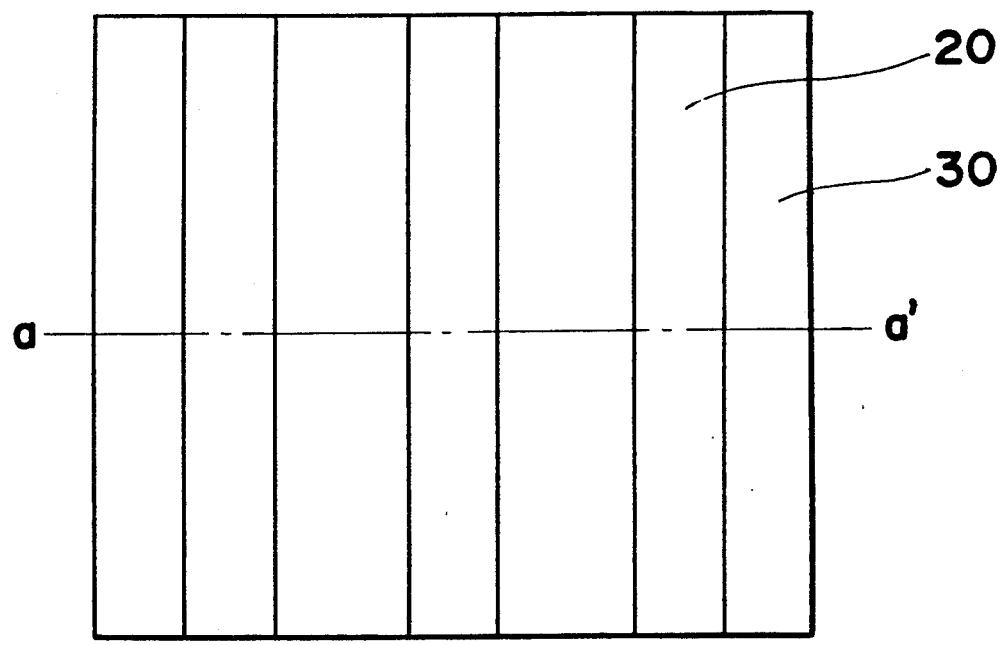
FIGS. 2(a) and 2(b) are schematic enlarged plan and cross-sectional views of the nonlinear optical thin-film according to the second preferred embodiment of the present invention.
Figure 2B:
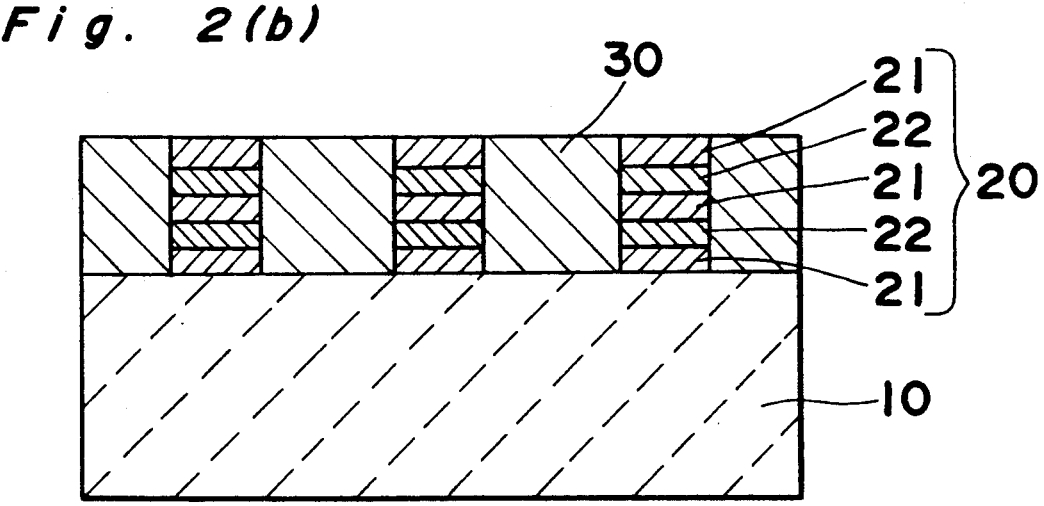

FIGS. 2(a) and 2(b) are plan view and cross sectional view along a—a' line of FIG. 2(a) showing the second preferred embodiment of the present invention.

The nonlinear optical thin-film according to the second preferred embodiment provides elements essentially same as those of the first preferred embodiment, namely, a substrate 10, superlattice thin films 20 and an insulating thin film 30 but the superlattice thin films 20 are formed linear in parallel with each other.

In this preferred embodiment, the line width of each superlattice thin film 20 is set at a value smaller than two times as long as the Bohr radius of the exciton because excitons are confined in a direction of the width of each superlattice thin film 20. This enhances the optical nonlinearity. Although the degree of increase regarding the optical nonlinearity is not so large as that of the first preferred embodiment, the total domain occupied by the superlattice thin films is increased in this preferred embodiment in comparison with the first preferred embodiment. Accordingly, the total nonlinearity obtained according to the second preferred embodiment becomes same order as that of the first preferred embodiment.

Particulars other than the above mentioned in the second preferred embodiment such as materials, thicknesses or the like of respective layers of the superlattice thin film are substantially same as those of the first preferred embodiment.

Third Preferred Embodiment

Figure 3:
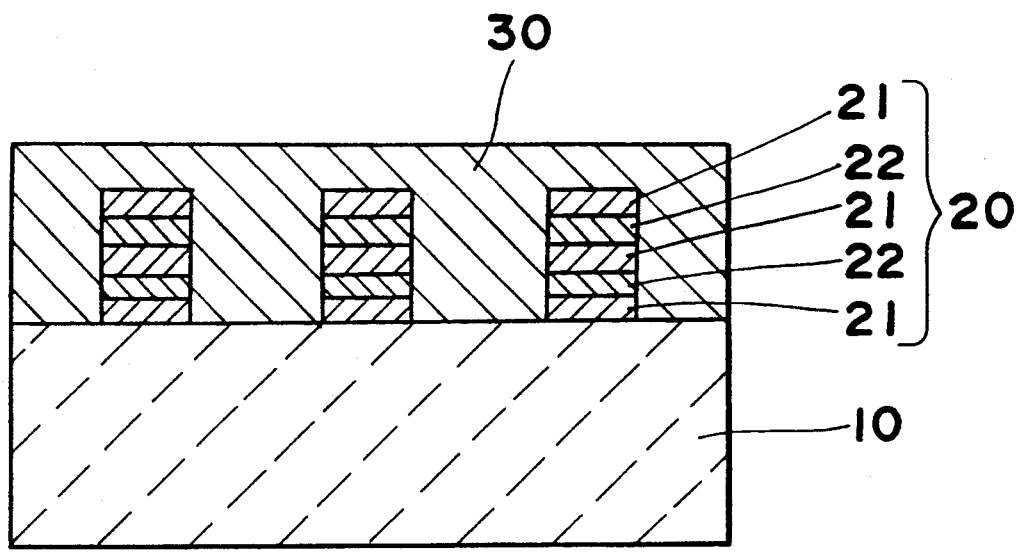
FIG. 3 is a schematic enlarged cross-sectional view of the nonlinear optical thin-film according to the third preferred embodiment of the present invention.
Figure 4:
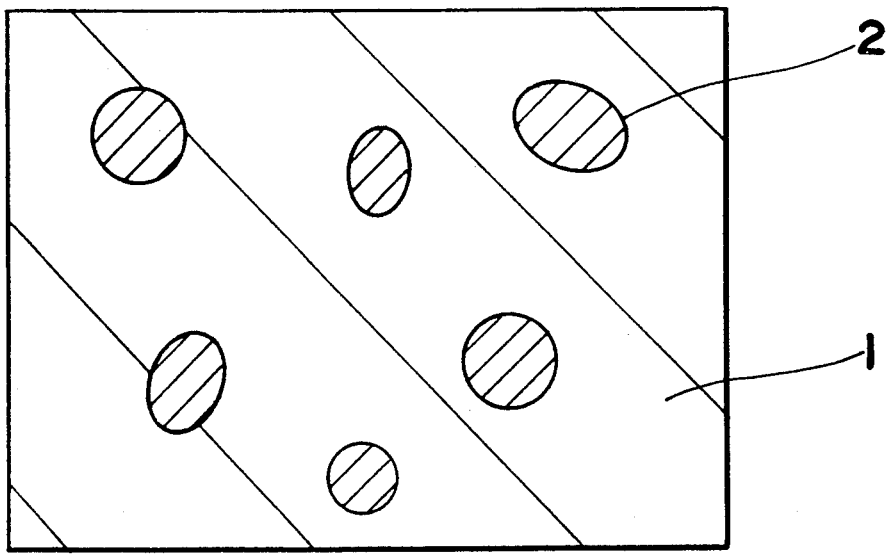
FIG. 4 is a schematic enlarged cross-sectional view showing a semiconductor doped glass as a conventional nonlinear optical material.

FIG. 3 is a cross-sectional view showing the third preferred embodiment of the present invention.

Composite elements of the third preferred embodiment are substantially same as those of the first preferred embodiment. However, in this preferred embodiment, the insulating thin film 30 covers the superlattice thin films 20. In this embodiment, it becomes possible to make the surface of the nonlinear optical thin-film smooth. This enables reduction of the scattering of light and an increase in efficiency as the nonlinear optical device. Also, the durability of the device is enhanced because the superlattice thin films are covered by the insulating thin film. In the third preferred embodiment, each superlattice thin film may be circular as in the first preferred embodiment or linear as in the second preferred one.

Particulars other than the above mentioned in the second preferred embodiment are substantially same as those of the first preferred embodiment.

It is understood that various other modifications will be apparent to and can be readily made by those skilled in the art without departing from the scope and spirit of the present invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which the present invention pertains.

What is claimed is:

1. Nonlinear optical thin-film comprising a substrate, a plurality of superlattice thin films spaced apart from each other on one surface of said substrate, each of said superlattice thin films being formed by stacking layers of two kinds of semiconductors having band-gap energies different from each other, alternately and a cover thin film made of a semiconductor or an insulator being formed so as to cover at least the areas of said one surface of said substrate not covered by said superlattice thin films, said semiconductor or insulator of said cover thin film having a band-gap energy wider than that of both of said two kinds of semiconductors.

2. The nonlinear optical thin-film as claimed in claim 1, in which said cover thin film is also formed over the top of said superlattice thin films.

3. The nonlinear optical thin-film as claimed in claim 1, in which thicknesses of respective layers of two kinds of semiconductors are chosen so as to form quantum levels of electrons and holes and to confine electrons and holes in respective layers.

4. The nonlinear optical thin-film as claimed in claim 1, in which each of said superlattice thin film is formed to have a linear configuration and the width of said linear configuration is chosen to be smaller than or equal to two times as long as the Bohr radius of an exciton.

5. The nonlinear optical thin-film as claimed in claim 1, in which each of said superlattice thin film is formed to have a circular configuration and the diameter of said circular superlattice thin film is smaller than or equal to two times as long as the Bohr radius of an exciton.

6. The nonlinear optical thin-film as claimed in claim 1, in which the minimum distance between adjacent superlattice thin films is chosen at a minimum length needed for confining electrons and holes in respective superlattice thin films.

7. The nonlinear optical thin-film as claimed in claim 1, in which said superlattice thin film is formed with group III - V compound semiconductors.

8. The nonlinear optical thin-film as claimed in any of claims 1 to 6, in which said superlattice thin film is formed with group II - VI compound semiconductors.

9. The nonlinear optical thin-film as claimed in claim 8, in which said group II - VI compound semiconductors are selected among a group of $ZnS_xSe_{1-x}$, $CdS_xSe_{1-x}$, $Zn_xCds_{1-x}S$, $Zn_xCd_{1-x}Se$, $Zn_xCd_{1-x}Te$, $Zn_xMn_{1-x}Se$, $Zn_xMn_{1-x}Te$, $Cd_xMn_{1-x}Se$ and $Zn_xMn_{1-x}Te$ systems wherein x is a value ranging from zero to one.

10. The nonlinear optical thin-film as claimed in claim 8, in which said group II - VI compound semiconductors are selected among a group of $ZnS_xSe_{1-x}$, $Zn_xCd_{1-x}S$ and $Zn_xCd_{1-x}S$ systems wherein x is a value ranging zero to one and said substrate is made of GaAs single crystal.

11. The nonlinear optical thin-film as claimed in claim 8, in which said group II - VI compound semiconductors are selected among a group of $CdS_xSe_{1-x}$, $Zn_xCd_{1-x}Se$, $Zn_xMn_{1-x}Te$ and $Cd_xMn_{1-x}Se$ systems wherein x is a value ranging zero to one and said substrate is made of InP single crystal.

12. The nonlinear optical thin-film as claimed in any of claims 1 to 6, in which said superlattice thin film is formed with GaAs and $ZnS_xSe_{1-x}$.

13. The nonlinear optical thin-film as claimed in any of claims 1 to 6, in which said cover thin film is made of an inorganic glass material or an organic polymer compound.

* * * * *